United States Patent [19]

Broom

[11] 4,141,146
[45] Feb. 27, 1979

[54] GARDEN ROW LOCATOR AND MARKER

[76] Inventor: D. Dwayne Broom, 7152 S. Seymour Rd., Swartz Creek, Mich. 48473

[21] Appl. No.: 812,451

[22] Filed: Jul. 5, 1977

[51] Int. Cl.² .......................... E04G 21/18; A01B 1/00
[52] U.S. Cl. .................................... 33/86; 33/137 R; 211/119.17
[58] Field of Search ................ 33/1 H, 180 R, 85, 86, 33/137, 138, 174 G; 211/119.17, 119.1; 248/295 C

[56] References Cited
U.S. PATENT DOCUMENTS

| | | | |
|---|---|---|---|
| 603,157 | 4/1898 | Spitzenberg | 33/137 R |
| 736,100 | 8/1903 | Hostettler | 33/86 |
| 854,916 | 5/1907 | Stoner | 33/86 |
| 1,183,351 | 5/1916 | De Roy | 33/180 R |
| 2,492,044 | 12/1949 | Hulquist | 33/86 |
| 2,508,491 | 5/1950 | Cayo | 211/119.01 |
| 2,656,608 | 10/1953 | Craig et al. | 33/85 |
| 3,678,592 | 7/1972 | Williamson | 33/137 R |
| 3,752,902 | 8/1973 | Wilson | 248/295 C |

*Primary Examiner*—Richard E. Aegerter
*Assistant Examiner*—John W. Shepperd
*Attorney, Agent, or Firm*—Hauke and Patalidis

[57] ABSTRACT

A device for planting a garden in straight rows comprising two stakes and a line held taut between the stakes, one end of the line being wound around a spool mounted to a clip of adjustable height on one stake and the other end of the line being affixed to a clip of adjustable height on the other stake. The device further comprises a distance measuring means attached to at least one of the stakes to locate the next row.

6 Claims, 8 Drawing Figures

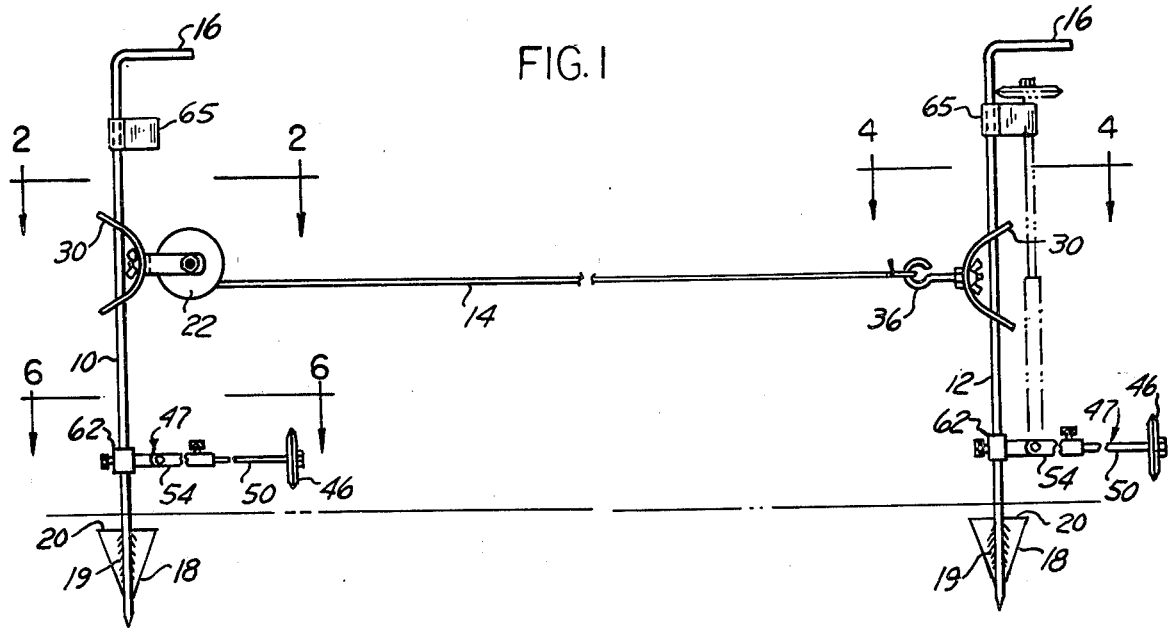
FIG. 1
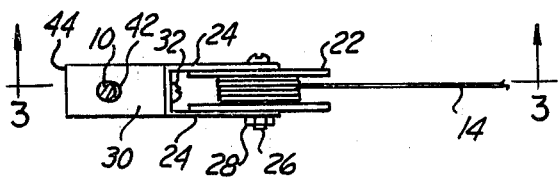
FIG. 2
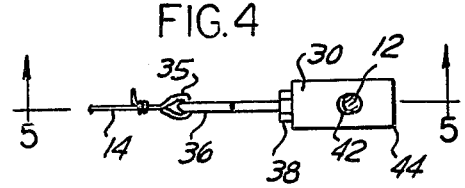
FIG. 4
FIG. 8
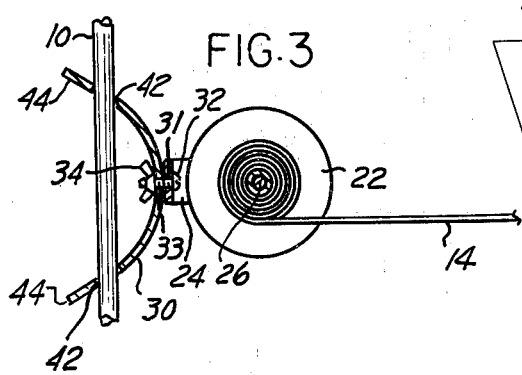
FIG. 3
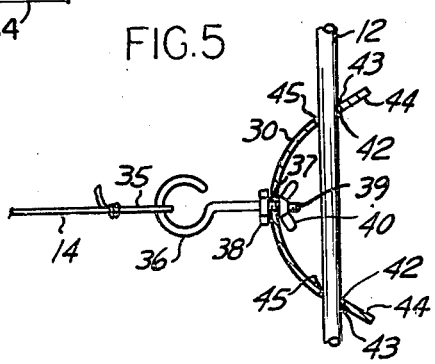
FIG. 5
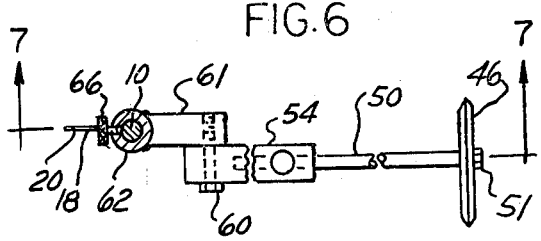
FIG. 6
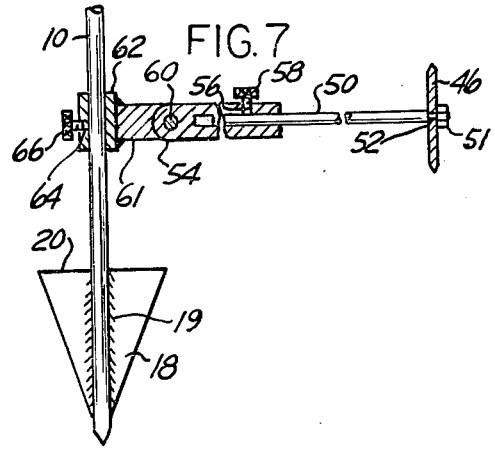
FIG. 7

GARDEN ROW LOCATOR AND MARKER

BACKGROUND OF THE INVENTION

Many devices have been made in the past to mark rows for planting or seeding which involve stringing a line between two stakes. All are either inconvenient to use or expensive to manufacture. The simplest of such devices, as for example disclosed in U.S. Pat. No. 2,107,989, involve tying a string to a stake or looping the string around the stake and passing the string through slots in the stake. Although inexpensive, such an arrangement has many disadvantages, not the least of which are the inconvenience of retying the string for each set-up, the requirement of a hammer to drive the stakes into the ground, and the absence of any mechanism to locate the next row.

Many attempts have been made to provide a device which would be easier to use. Most involve a take-up spool or reel affixed to one of the stakes. Different applications and variations in seeding and planting techniques, however, make it advantageous if a row marker provides for adjusting the height of the line above the ground, making devices in which no adjustment is provided like those disclosed in U.S. Pat. No. 2,555,457, and in U.S. Design Pat. No. 153,495 of limited value. In a marker like that disclosed in U.S. Pat. No. 2,836,897, a wire spring clip is added to each stake. The line is tied to one and loops the other, finally being fed to a spool disposed vertically at the end of one of the stakes. Readjustment of the line by rotating the stake which spools the line is required after each height adjustment.

The present invention provides a seeding or planting row marker which permits adjustment of the height of the line, yet which eliminates the inconvenience of having an adjustable spring clip separate from the reel by making the reel directly adjustable in height by hand, and which further provides a mechanism for locating the next row.

SUMMARY OF THE INVENTION

The present invention provides a garden row marker which is simple and inexpensive to manufacture and yet convenient to operate. The row marker line is fed from a reel which can be directly and easily adjusted in height by hand, a measuring means connected to the base of the stakes to regularly space consecutive rows to be planted or seeded, and the stakes can be driven into the ground by foot pressure and removed and carried by handles integrally formed on the end of the stakes.

The objects and advantages of the present invention will become apparent to those skilled in the art when the following detailed description of an example of a structural embodiment of the invention is read in conjunction with the accompanying drawing wherein like reference characters refer to like parts throughout the several views, and in which:

BRIEF DESCRIPTION OF THE DRAWING

FIG. 1 is a schematic view of an example of a structure according to the invention;

FIG. 2 is a partial cross-sectional view taken along line 2—2 of FIG. 1;

FIG. 3 is a partial cross-sectional view taken along line 3—3 of FIG. 2;

FIG. 4 is a partial cross-sectional view taken along line 4—4 of FIG. 1;

FIG. 5 is a partial cross-sectional view taken along line 5—5 of FIG. 4;

FIG. 6 is a partial cross-sectional view taken along line 6—6 of FIG. 1; and

FIG. 7 is a partial cross-sectional view taken along line 7—7 of FIG. 6; and

FIG. 8 is a partial elevation view showing a modification of the structure of FIGS. 6-7.

DETAILED DESCRIPTION OF THE PREFERRED EMBODIMENTS

The invention, as illustrated at FIG. 1, comprises a pair of stakes 10 and 12 driven in the ground and supporting a line 14 stretched therebetween. As used herein, a line may be a rope, string, wire, tape or cable, for example. The stakes may be made of wood or plastic and may have a round or square cross-section, but preferably they are made from metallic tubing or rod. A handle 16 is formed integrally at the top of each stake by bending the tubing or rod proximate its end. A triangular metallic plate 18 is fastened, see FIG. 7, by welds 19 or the like, proximate the lower end of each stake and points downwardly, thus permitting the stake 10 or 12 to be driven into the ground by foot pressure applied to the upper surface 20 of the triangular plate.

One end of the line 14 is wound around a preferably self-winding spool 22. As best shown at FIGS. 2 and 3, the reel 22 is secured to a U-shaped bracket 24 by a bolt or screw 26 having a threaded end accepting a nut 28, or by any other convenient means. The U-shaped bracket 24 is in turn secured to a spring mounting clip 30, for example, by a bolt 32 passed through an aperture 31 in the base of the bracket 24 and an aperture 33 in the center of clip 30 and a wing nut 34 fastened to the bolt, the bow of clip 30 facing away from the reel.

Referring to FIGS. 4 and 5, the other end of the line 14 is secured to a hook 36, for example by passing the hook through a loop 35 formed by knotting the line. The hook 36 has a threaded end 37 passed freely through an aperture 39 located at the center of a spring mounting clip 30, alike the spring mounting clip supporting the reel 22, and the hook 36 is fastened to its mounting clip 30 by means of a nut 38 disposed on the front side of the clip and a wing nut 40 disposed inside the curve of the clip, both threading over the threaded end 37 of the hook.

As shown in FIGS. 3 and 5, the spring mounting clips 30 are bowed stampings of spring steel each which apertures approximately in shape to the cross-section of stakes 10 and 12 when the clip is slightly deflected. Thus, for example, when the stakes have a circular cross-section, apertures 42 are elliptical. The stake is passed through the apertures 42 of the clip. The elastic spring force of the clip tending to relax is exerted at the edges 43 and 45 of the aperture and holds the clip securely to the stake at a given height. The clip is repositionable along the stake by squeezing together its ends 44, thereby increasing the apparent cross-section of the apertures 42 and permitting the spring to move freely over the length of the stakes and then releasing the ends 44 when the clip is manually positioned at an appropriate height.

At least one of the stakes 10 and 12 is provided at its base with a means to measure to the next row. That means may simply comprise a line adjustably attached to the base of the stake, but in the preferred embodiment, there is an adjustable arm 47 carrying a marker, such as a wheel 46. Referring to FIGS. 6 through 8, the arm comprises a rod 50 having a reduced diameter threaded end passed through a central hole in the wheel 46 such that the wheel rotatably secured to the end of the rod 50 by a nut 51. The other end of the rod 50 is inserted into a tube 54 of inner diameter slightly larger than the outer diameter of the rod, thus permitting the rod to telescopically move within the tube 54. The tube 54 is provided, proximate an end, with a radially disposed tapped hole 56, into which is inserted a thumb screw 58 when tightened, locks the rod 50 with its wheel carrying end projecting from the tube 54 to the desired distance.

The other end of the tube 54 may be fastened, by welds or the like, to a short tubular collar 62, but preferably the tube is held by a shouldered screw 60 to an ear 61 of collar 62, such that the arm 47 may be rotated to a position parallel to the stake for storage. The stake may be provided with a clip 65 to secure the arm 47 in the upright position.

The collar 62, through which one of the stakes 10 and 12 passes, has an inner diameter slightly greater than the outer diameter of the stake and has a threaded hole 64 into which a thumb screw 66 is inserted which, when tightened, prevents the collar 62 from moving along the stake.

Alternatively, the row locating means could simply consist of a line 64 which is adjustably attached to the base of at least one stake, as shown at FIG. 8.

In operation, the stakes 10 and 12 are planted in the ground at the longitudinal extremes of the first row to be seeded or planted. The clips 30 are adjusted to locate the line 14 at the proper height above the ground. The row finder arm 45 is adjusted to the desired length. After planting is compleated along the first row, the next row is located using arm 47 and the stakes 10 and 12 are repositioned appropriately.

It will be appreciated that the invention having been disclosed by means of a typical embodiment thereof, modifications whereof will be obvious to those skilled in the art, no necessary limitations should be understood from the foregoing detailed description as such modifications may be made without departing from the spirit of the invention or the scope of the appended claims.

What is claimed as new is as follows:

1. A row marker comprising a pair of stakes, a line held taut between the stakes, a reel from which the line is played, means for adjustably affixing said reel to one of said stakes, means for adjustably attaching the free end of said line to the other of said stakes, and a distance determining means adjustably attached to one of said stakes for locating a next row, wherein said distance determining means comprises a row-locating arm of adjustable length hingedly secured at the base of said stake and said stake further comprises means to secure said row-locating arm substantially parallel to said stake when said arm is not in use.

2. The row marker of claim 1 further comprising a downwardly pointing triangular metal plate fastened proximate to the lower end of each of said stakes and providing a surface for driving said stake into the ground by foot pressure.

3. The row marker of claim 1 wherein said means for adjustably affixing said reel to one of said stakes comprises a resilient bowed clip supporting member, a pair of apertures each disposed proximate each end of said clip member with said stake being passed through said apertures, the ends of said clip member being naturally biased away from each other by the stake, said clip member being held to said stake by the frictional force of the edge of each of said apertures on the stake, said clip member being releasable and adjustable along the stake by manually deflecting the ends of said clip member towards each other, and means for affixing said reel to said clip.

4. The row marker of claim 1 further comprising said distance determining means adjustably attached to both of said stakes for locating a next row.

5. The row marker of claim 1 wherein said row-locating arm comprises a telescoping pole, a wheel rotatably affixed at one end of said pole, and means for adjustably attaching the other end of said pole hingedly to said stake.

6. The row marker of claim 1 wherein said means for adjustably attaching said free end of said line to the other of said stakes comprises a resilient bowed clip supporting member, a pair of apertures each disposed proximate each end of said clip member with said stake being passed through said apertures, the ends of said clip member being naturally biased away from each other by the stake, said clip member being held to said stake by the frictional force of the edge of each of said apertures on the stake, said clip member being releasable and adjustable along the stake by manually deflecting the ends of said clip member towards each other, and means for attaching the free end of said line to said clip member.

* * * * *